United States Patent [19]
Jamison

[11] 3,778,713
[45] Dec. 11, 1973

[54] TRANSISTOR AND DIODE TESTER
[76] Inventor: Wayne L. Jamison, 3302 Roaming Woods Ln., Spring, Tex. 77373
[22] Filed: Apr. 6, 1972
[21] Appl. No.: 241,762

[52] U.S. Cl. .......................... 324/158 T, 324/158 D
[51] Int. Cl. .......................................... G01r 31/22
[58] Field of Search ..................... 324/158 T, 158 D

[56] References Cited
UNITED STATES PATENTS
| | | | |
|---|---|---|---|
| 3,676,767 | 7/1972 | Boelter | 324/158 T |
| 2,895,106 | 7/1959 | Taunt | 324/158 T |
| 3,458,814 | 7/1969 | Ryan | 324/158 T |

Primary Examiner—Rudolph V. Rolinec
Assistant Examiner—Ernest F. Karlsen
Attorney—Carlos A. Torres et al.

[57] ABSTRACT

An illustrative embodiment of the invention includes transistor/diode test apparatus employing an A.C. power source. A metering circuit and the device to be tested are placed across the A.C. power source. Switching means for applying the device terminals to the A.C. power source in various configurations while metering the response of the device to the A.C. power is also provided. The test apparatus may be used for either "in circuit" or "out of circuit" component testing.

6 Claims, 3 Drawing Figures 3,778,713

TRANSISTOR AND DIODE TESTER

BACKGROUND OF THE INVENTION

This invention relates to apparatus for testing solid state circuit devices, and more particularly, to apparatus for testing transistors or diodes either in or out of a usage circuit.

In commercial electronic repair or construction work, it is often desirable to test a diode or transistor in or out of a usage circuit. Exact quantitative measurements of the efficiency of the device are not always necessary or even desirable, particularly if the job is one of troubleshooting. In this instance, it is usually necessary only to be able to label the device either "good" or "bad," or perhaps to identify the device as silicon or germanium based or PNP or NPN. For such applications elaborate, expensive prior art test apparatus, wherein the device to be tested (hereafter referred to as "test device") is elaborately metered or placed in an oscillator circuit under controlled D.C. voltage test conditions, is not required. A more practical and inexpensive approach is to test the device for leakage current and to test the emitter/base and collector/base diode characteristic of the device.

Accordingly, it is an object of the invention to provide a relatively simple and inexpensive test apparatus for in or out of circuit transistor and diode testing.

It is a further object of the invention to provide a fast, convenient apparatus for determining the polarity (NPN or PNP) characteristic and the base material (Si or Ge) of a solid state device.

It is a yet further object of the invention to provide test apparatus capable of in or out of circuit rapid qualitative evaluation of a solid state circuit device.

Briefly, the above and other objects, features and advantages are provided by a transistor test apparatus having an A.C. voltage source, a D.C. voltage metering circuit, and suitable switching means for applying the A.C. voltage simultaneously across the test device and the metering circuit in a plurality of test device terminal configurations. The averaging effect of the D.C. metering circuit enables expensive D.C. power supply circuits or oscillator circuitry to be avoided. Appropriate indications on the meter face indicate the quality of various characteristics of the device as either "good" or "bad," identify the type (NPN or PNP) of device, and whether the device is Si or Ge based.

The invention is best understood by means of the following detailed description thereof when taken in conjunction with the accompanying drawings, in which:

DESCRIPTION OF THE PREFERRED EMBODIMENT

Figure 2:
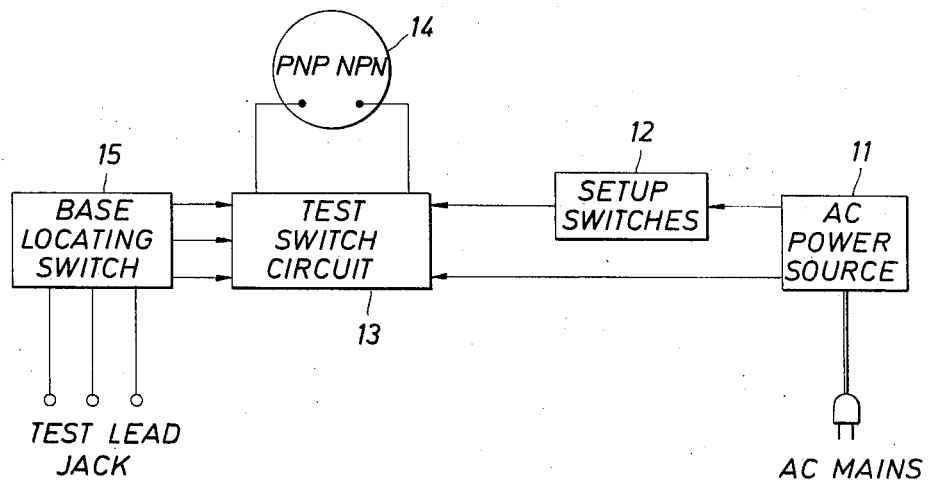
FIG. 2 is an overall block diagram schematically illustrating the operational principles of the invention.

Referring initially to FIG. 2, a block diagram illustrating the overall operation of the invention is shown. An A.C. power source 11 is coupled via a plurality of set-up switches 12 to a test switch circuit 13 which includes a relatively sensitive, center zero, D.C. current meter 14. The transistor or diode to be tested (not shown) is also connected to the test switch circuit 13 via a base locating switch 15. Set-up switches 12 comprise appropriate means, as will be described, for supplying either a relatively higher or lower-sensitivity to meter 14 for use in either "in circuit" or "out of circuit" testing or "high power" or "low power" test applications. Base locating switch 15 allows, as will be subsequently described, the test transistor or diode to be connected to the external input test leads at random. This is a particularly useful feature in cases where the terminal connections of the test device are unknown.

Figure 3:
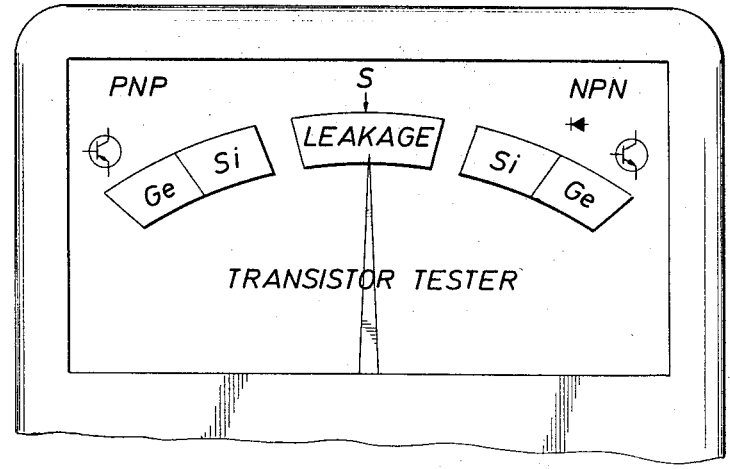
FIG. 3 is an illustration of the meter-indicator face used in the invention.

The test switch circuit 13 functions to apply the relatively low A.C. voltage supplied by A.C. power source 11 to the test device in different circuit configurations as will be described in more detail. Meter 14 is connected so as to monitor the response of the test device in each of these circuits. By using a D.C. current meter as meter 14 and applying 60 Hz low voltage A.C. to the test device the diode, short and leakage characteristics of the test transistor or diode may be measured without injury to the device. Additionally, the use of complicated oscillator or D.C. power supply circuits are avoided in testing the device and relatively simple qualitative indications of its performance are indicated by the face of the D.C. meter 14 as illustrated in FIG. 3. The use of the D.C. meter with a time constant too slow to follow the rapidly varying 60 Hz A.C. voltage applied to the device obviates the necessity for an internal D.C. power supply. By testing the short, leakage and diode characteristics of a three terminal test device the use of complicated oscillator circuitry, which may be sensitive to the type of test device, is avoided. Both these features enable more economical operation of the invention for practical usage than prior art test apparatus.

Figure 1:
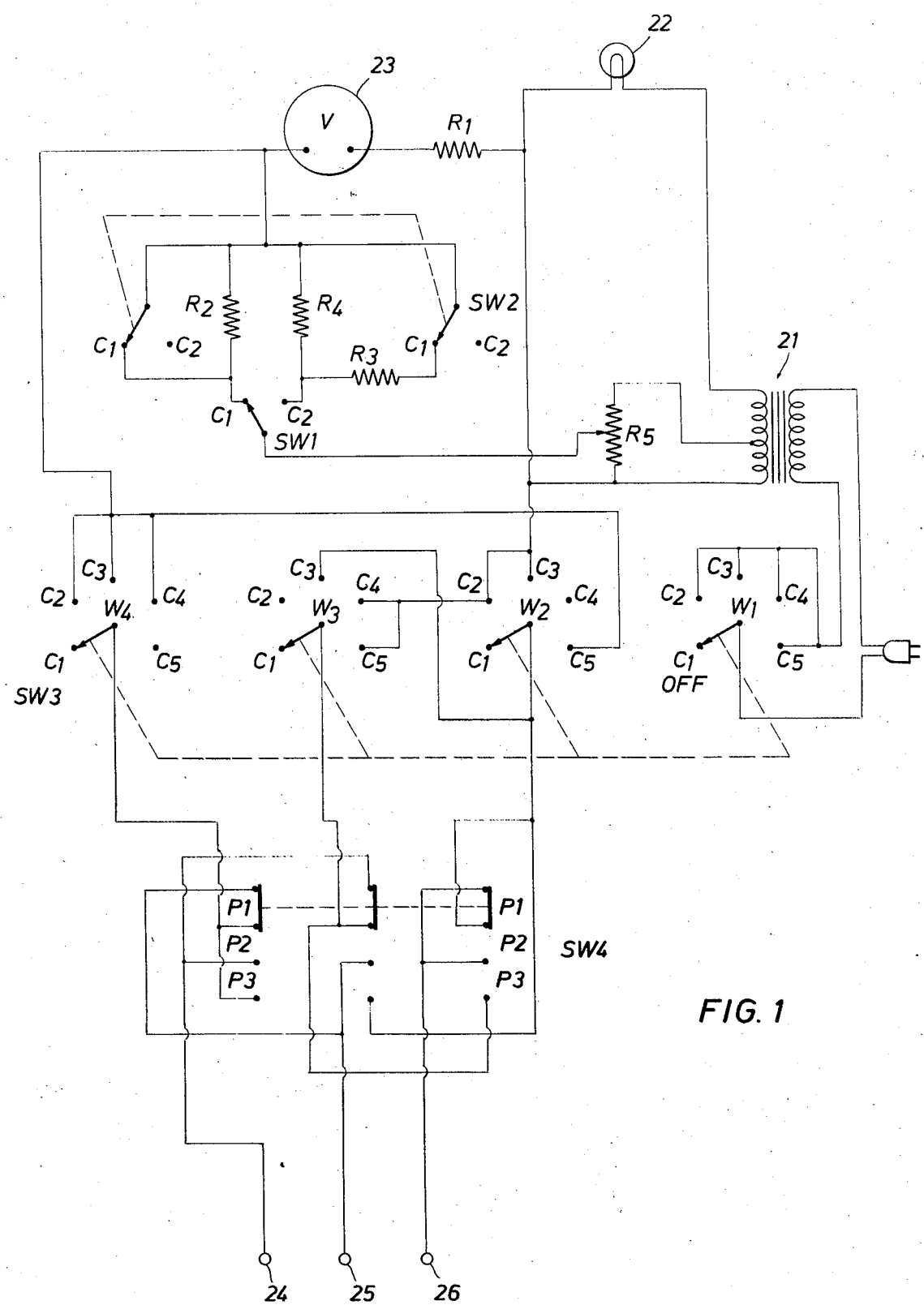
FIG. 1 is a circuit diagram of the preferred embodiment of the invention.

Referring now to FIG. 1, the circuitry of the transistor tester of the present invention is shown in more detail. A step down A.C. transformer 21 has its primary winding connected to the 110 volt A.C. power mains via wafer W1 of switch $Sw_3$. The full secondary voltage of the transformer 21 (approximately 6 volts) is applied across on-off indicator lamp 22 whenever the instrument is turned on by turning wafer W1 of switch $Sw_3$ to any positions of $C_1$, $C_2$, $C_3$, $C_4$ or $C_5$. A portion of the secondary voltage of transformer 21 is applied via potentiometer $R_5$, switch $Sw_1$, a one pole, two position switch, and a resistor network comprising resistor $R_2$, $R_3$ and $R_4$ controlled by switch $Sw_2$, a two pole, two position switch across a center zero, D.C. meter 23. Meter 23 preferably is about a 50 microampere movement having a time constant slow enough to remain on its center zero when placed directly across an A.C. current source. Meter 23 is connected with a relatively large value series resistor $R_1$ to form a D.C. voltmeter across the test device and the A.C. power source 21.

The three terminal test device is connected with its leads at random to input terminals 24, 25 and 26. These input terminals are connected via switch $Sw_4$, a three pole, three position slide switch, to the test switch circuit. The output terminals of switch $Sw_4$ are connected to the wiper arms of wafers W2, W3 and W4 of switch $Sw_3$, which is a four pole, five position switch used to connect the test device terminals in various circuit configurations. If a two terminal test device is being tested, its terminals may be placed at random across any two of the terminals 24, 25 or 26 as desired.

In operation, the test device (three terminal) is placed at random onto the three input terminals 24, 25 and 26. Switch $Sw_1$ (high or low power) is set to the appropriate position to test a high current or low current device. Switch $Sw_2$ (in-out circuit test) is set to the appropriate position to test the device either in or out of the circuit in which it is being used. With switch $Sw_1$ set in position $C_1$ the output voltage from potentiometer $R_5$ (which is set to deliver about 2 volts peak A.C.) is connected across the test device and the meter circuit. This corresponds to the current used to test a high power device. With switch $Sw_1$ set to position $C_2$, the output voltage from potentiometer $R_5$ is applied via a current limiting resistor network (essentially either $R_3$ or $R_4$ depending on the setting of switch $Sw_2$) limiting the current through the test device to produce the desired voltage drop. This corresponds to the current used to test a low power device. With switch $Sw_2$ set to position $C_1$, the full high or low power test current (as selected by switch $Sw_1$) is applied to the test circuit. This corresponds to the "in circuit" test position. With switch $Sw_1$ in this position, test devices with as little as 47 ohm shunt impedance across either emitter or collector may be tested "in circuit," provided they are not in a direct coupled circuit. "In circuit" tests in direct coupled circuit stages are inconclusive due to the fact that unknown circuit impedances may influence the test measurements.

With switch $Sw_2$ set to position $C_2$ (corresponding to "out of circuit" test) a reduced current is supplied to the test circuit via either resistor $R_2$ or $R_4$ (depending on the setting of switch $Sw_1$). In this manner switches $Sw_1$ and $Sw_2$ choose the test current to be delivered to the test device and the meter circuit for performing the test under appropriate conditions.

Once switches $Sw_1$ and $Sw_2$ are properly set, the instrument in turned on by rotating multiple switch $Sw_3$ from position $C_1$ to initially position $C_2$. In position, $C_2$ (and all other positions through $C_5$) the A.C. voltage from the power mains is applied to transformer 21 via wafer W1 of $Sw_3$. Placing $Sw_3$ in position $C_2$ also enables switch $Sw_4$ to be positioned properly to correctly connect the emitter, base and collector of the test device. With $Sw_4$ in position $P_1$, input terminal 24 is connected to the wiper arm of wafer W3 of $Sw_3$, terminal 25 to the wiper arm of wafer W4, and terminal 26 to the wipe arm of wafer W2 of $Sw_3$. With $Sw_4$ in position $P_2$, terminal 24 is connected to W4 of $Sw_3$, terminal 25 to W3 and terminal 26 to W2. With $Sw_4$ in position $P_3$ terminal 24 is connected to the wiper arm of wafer 24, terminal 25 to W2 and terminal 26 to W3. Thus, since the polarity (NPN or PNP) of the test device is not relevant to proper operation of the tester, one of these three positions will correctly place the base of the device at the wiper of wafer W3 of $Sw_3$ where the remainder of the tests are to be performed. In usage, only one position of $Sw_4$ will produce the center scale reading on the leakage test (position $C_2$ of $Sw_3$) or the test device is bad.

Once switch $Sw_4$ is also properly positioned with switch $Sw_3$ at position $C_2$ the leakage test is performed. In this position, the A.C. supply voltage is placed across the emitter-collector terminals of the test device with the base floating and the indicator of FIG. 3 should show little or no leakage current (i.e., stay in the "leakage" zone of the meter face) if the device is good Next, turning the switch $Sw_3$ to position $C_3$ connects A.C. supply voltage across the test device base (which is shorted to one of the device's other terminals) and the opposite terminal of the device (either emitter or collector, depending on the connection to input terminals 24, 25 and 26). If the device does not conduct in this switch position, the emitter and collector are shorted. Such a short would cause the indicator FIG. 3 to remain in the leakage zone. A meter indication to one side or the other is then an indication of no short. The amount of meter indication indicates whether the device is silicon (Si) or germanium (Ge). With 2 volts A.C. peak applied to the device a germanium device will saturate at a meter indication of about 0.24 volts. This difference, which is caused by the relative difference in the Fermi energy of the conduction bonds in doped silicon and doped germanium (base material), can then be used as illustrated on the meter face of FIG. 3 to indicate which type of device is under test.

When switch $Sw_3$ is rotated to position $C_4$, the A.C. supply voltage is applied across the base to device terminal connected to wafer W4. The device terminal connected to wafer W2 is left floating. This tests the base to emitter or base to collector diode characteristic of the test device (depending on whether emitter or collector is connected to W4). Here a deflection of the FIG. 3 indicator to the left indicates a PNP type device while a deflection to the right indicates an NPN type device. No deflection indicates a base to terminal short or open in the device.

Finally, with switch $Sw_3$ in position $C_5$, the A.C. supply voltage is applied across the test device's base and its opposite terminal (i.e., that connected to W2). Again no deflection indicates either an open or short in the base to emitter/collector diode. In this manner then, all of the above tests may be applied to the test device either in or out of circuit and without initially knowing the terminal identity of the device.

While a particular embodiment of the present invention has been shown and described, it is apparent that changes and modifications may be made without departing from the invention in its broader aspects. It is the aim in the appended claims to cover all such changes and modifications as fall within the true spirit and scope of the invention.

I claim:

1. Apparatus for testing solid state circuit devices comprising:
    a. at least three test device input terminals;
    b. a relatively low voltage AC power source;
    c. a center zero D.C. voltage minitor having a time constant long enough to be substantially unresponsive to the frequency of said A.C. power source;
    d. first switching means for selectively alternately coupling single terminal pairs or shorted terminal pairs and a single terminal of the test device in series relationship with said D.C. voltage monitor in parallel relationship across said A.C. power source; and
    e. second switching means for effectively varying the connection sequence of the input terminals of said test device to said first switching means in such a manner that one position only of said second switching means establishes a known relationship for the connection of the base of a test device to said first switching means.

2. The apparatus of claim 1 and further including: switching means for varying the relative magnitude of the current from said A.C. power source which is applied across said D.C. voltage monitor and said test device terminals, whereby high or low power devices may be tested either in or out of a usage circuit.

3. Apparatus for testing solid state circuit devices comprising:
   a. a relatively low voltage A.C. power source;
   b. at least three test device input terminals;
   c. a center zero D.C. voltage meter having a time constant long relative to the operating frequency of said A.C. power source;
   d. first switching means for selectively alternately coupling single terminal pairs or shorted terminal pairs and a single terminal of the test device in series relationship with said D.C. voltage meter across said A.C. power source;
   e. indicating means on said D.C. voltage meter for qualitatively indicating the polarity of a test device and the base material (of Si or Ge) of the test device; and
   f. second switching means for effectively varying the connection sequence of the input terminals of said test device to said first switching means in such a manner that one position only of said second switching means establishes a known relationship for the connection of the base of a test device to said first switching means.

4. The apparatus of claim 3 wherein said first switching means includes first switch means for selectively varying the magnitude of the A.C. current applied to said test device terminals and second switch means for selectively varying the order in which said test device terminals are connected across said A.C. power source.

5. The apparatus of claim 4 and further including third switch means for effectively varying the sensitivity of said testing apparatus to provide test states for in or out of circuit and high or low power solid state device testing.

6. The apparatus of claim 5 and further including potentiometer means for adjusting the magnitude of said A.C. voltage to a predetermined relatively low level which is not harmful to a solid state test device.

\* \* \* \* \*

UNITED STATES PATENT OFFICE
CERTIFICATE OF CORRECTION

Patent No. 3,778,713      Dated December 11, 1973

Inventor(s) Wayne L. Jamison

It is certified that error appears in the above-identified patent and that said Letters Patent are hereby corrected as shown below:

IN THE SPECIFICATION

Column 3, line 37:  change "in" to --is--.

Column 3, line 47:  change "wipe" to --wiper--.

Column 3, line 66:  after "good" insert --.--.

IN THE CLAIMS

Col. 4, lines 56, 57:  change "series" to --parallel--.

Col. 5, lines 16, 17:  change "series" to --parallel--.

Signed and sealed this 21st day of May 1974.

(SEAL)
Attest:

EDWARD M. FLETCHER, JR.
Attesting Officer

C. MARSHALL DANN
Commissioner of Patents